(12) United States Patent
Spezzani

(10) Patent No.: US 8,806,701 B2
(45) Date of Patent: Aug. 19, 2014

(54) ROLLER CLEANING DEVICE

(75) Inventor: Stefano Spezzani, Baiso (IT)

(73) Assignee: Keraglass Engineering S.R.L., Baiso (IT)

( * ) Notice: Subject to any disclaimer, the term of this patent is extended or adjusted under 35 U.S.C. 154(b) by 222 days.

(21) Appl. No.: 13/574,184

(22) PCT Filed: Jan. 18, 2011

(86) PCT No.: PCT/IB2011/050204
§ 371 (c)(1),
(2), (4) Date: Jul. 19, 2012

(87) PCT Pub. No.: WO2011/095906
PCT Pub. Date: Aug. 11, 2011

(65) Prior Publication Data
US 2012/0297568 A1   Nov. 29, 2012

(30) Foreign Application Priority Data

Feb. 2, 2010   (IT) .............................. M02010A0020

(51) Int. Cl.
| | |
|---|---|
| *B08B 1/00* | (2006.01) |
| *B65G 45/10* | (2006.01) |
| *C03B 35/16* | (2006.01) |
| *F27D 25/00* | (2010.01) |
| *F27B 9/24* | (2006.01) |
| *F27B 9/30* | (2006.01) |

(52) U.S. Cl.
CPC .............. *C03B 35/168* (2013.01); *B65G 45/10* (2013.01); *B08B 1/008* (2013.01); *F27D 25/001* (2013.01); *F27B 9/2407* (2013.01); *F27B 9/30* (2013.01)
USPC ....................... 15/256.53; 15/88.4; 15/104.04

(58) Field of Classification Search
USPC ................. 15/88, 88.2, 104.04, 88.4, 256.53, 15/256.51
See application file for complete search history.

(56) References Cited

U.S. PATENT DOCUMENTS

| | | |
|---|---|---|
| 3,481,727 A | 12/1969 | Dickinson et al. |
| 4,042,364 A | 8/1977 | King et al. |
| 4,208,754 A | 6/1980 | Hille |
| 6,170,293 B1 | 1/2001 | Cody |

FOREIGN PATENT DOCUMENTS

| | | |
|---|---|---|
| KR | 940 000 720 B1 | 1/1994 |
| WO | 00/43135 A1 | 7/2000 |

*Primary Examiner* — Shay Karls
(74) *Attorney, Agent, or Firm* — Pearne & Gordon LLP

(57) ABSTRACT

A roller cleaning device, in particular for roller kilns specifically destined for performing heat treatments of glass sheets in which the glass sheets rest directly on the rollers, characterized in that it comprises: a cleaning element (2), predisposed to enter into contact with a surface of at least a roller (100) and to clean the surface; motor means (30,31), predisposed to activate the cleaning element (2) to slide at least along a longitudinal direction (x) of the roller (100).

10 Claims, 2 Drawing Sheets

ROLLER CLEANING DEVICE

FIELD OF THE INVENTION

The invention relates to a device for cleaning rollers, in particular for roller conveyor planes.

PRIOR ART

Roller conveyors are widely present in many technical sectors, known also as roller planes, by means of which objects of various natures are advanced along a determined direction. A field in which roller planes are widely used is in kilns for heat treatment of glass sheets where the sheets are directly rested on rollers. In the production cycle, the glass sheets are transported on roller plane conveyors, in particular during the heat treatment performed inside the kilns.

Roller plane conveyors comprise a plurality of rollers which are parallel and flanked to one another along a conveying direction. At least some of the rollers are motorised.

A particularly relevant problem in all sectors of use is the difficulty in cleaning the rollers which make up the conveyor planes. The cleaning of the rollers is performed by hand by one or more operatives who have to move along the whole conveyor plane in order to reach all the rollers. Apart from being long and laborious, the operation also involves a certain degree of risk, as the rollers have to be activated in rotation during the cleaning operation in order that the whole surface of the rollers can be carefully cleaned. The above-described drawbacks are considerably accentuated when it becomes necessary to clean a roller conveyor plane located internally of a kiln for heat treatment of glass sheets where the sheets are directly rested on the rollers. In this case, the kiln has to be turned off and cooled almost down to ambient temperature in order to enable access by the operatives.

An aim of the present invention is to provide a device for cleaning rollers, in particular for roller conveyor planes, which enables the rollers to be cleaned easily and carefully, but without the need for any operatives to enter into contact with the actual rollers.

The invention also exhibits the important characteristic of not requiring removal of the rollers from the kiln. It is used with the rollers still in their seatings internally of the kiln.

DESCRIPTION OF THE INVENTION

Further characteristics and advantages of the present invention will clearly emerge from the following non-limiting description, of a preferred but not exclusive embodiment of the invention, as illustrated in the accompanying drawings, in which.

Figure 1:
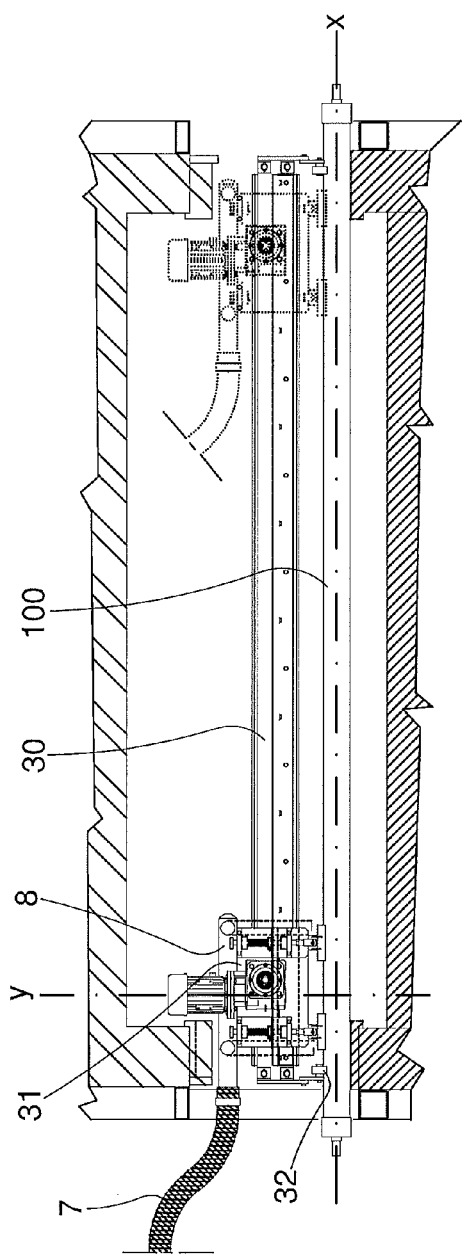
FIG. 1 illustrates a part of a transversal section of a roller kiln for heat treatment of glass sheets.
Figure 2:
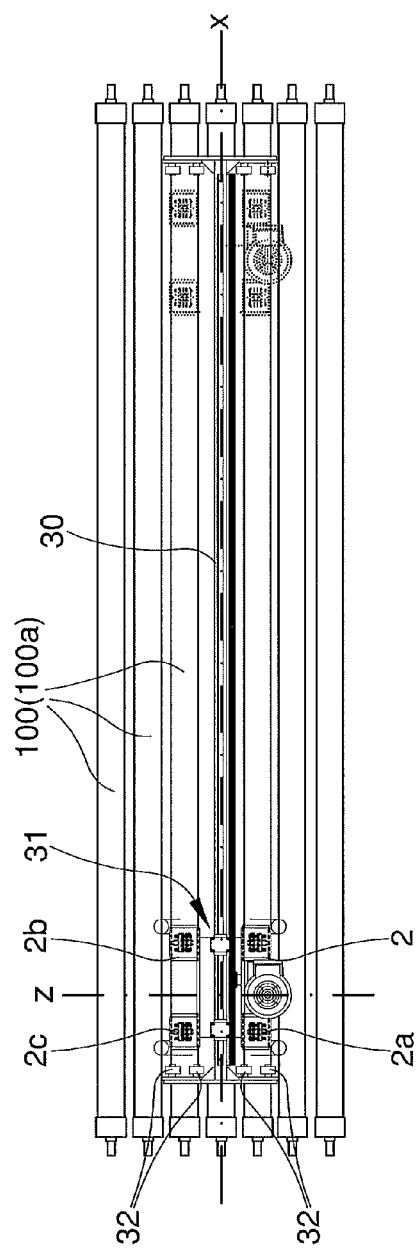
FIG. 2 illustrates a part of a view from above of FIG. 1.
Figure 3:
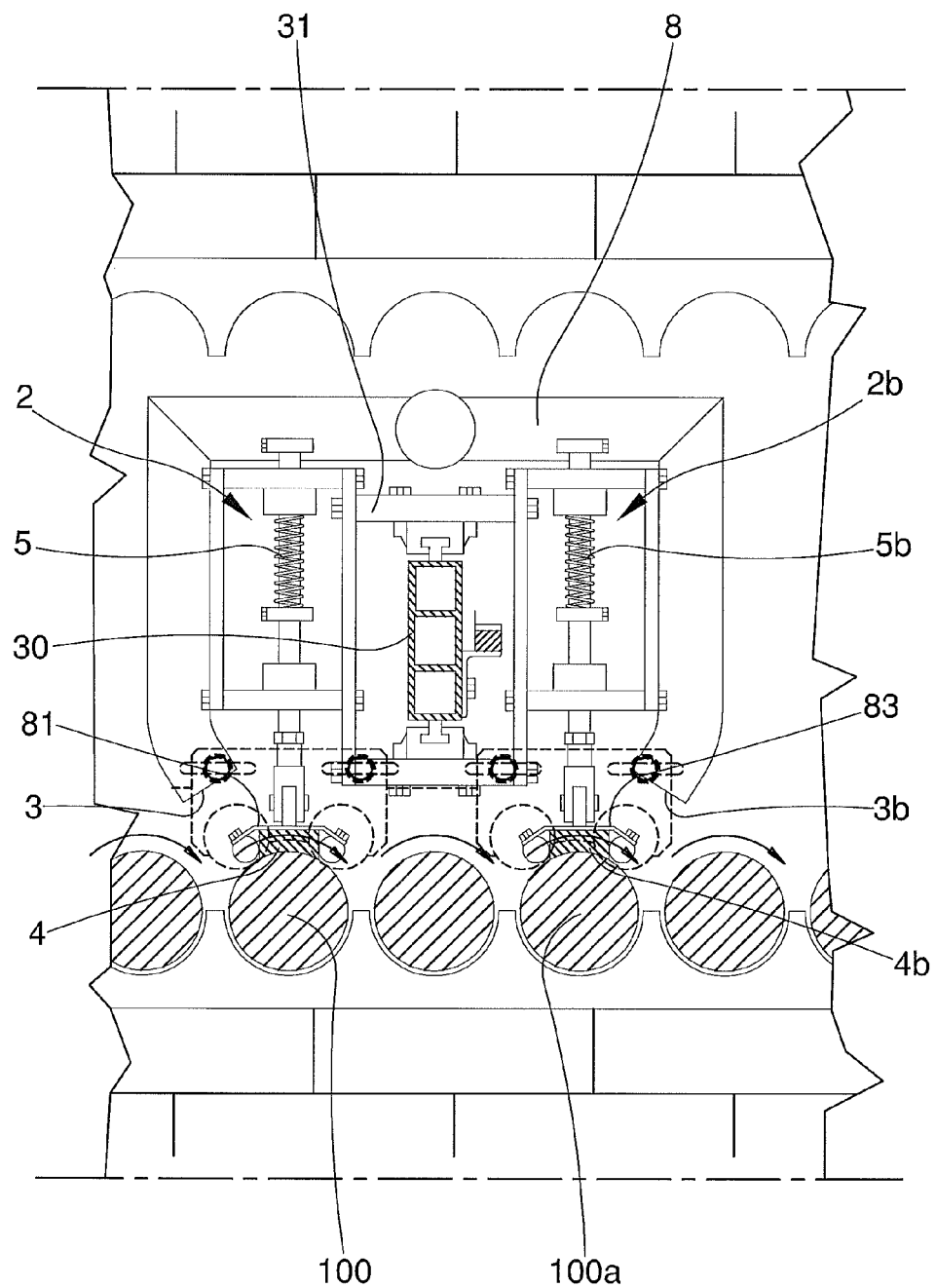
FIG. 3 shows, in enlarged scale, part of a section made along a perpendicular plane to the rollers.

The device for cleaning rollers according to the present invention is particularly suitable for cleaning rollers which form a roller conveyor plane, such as for example roller planes used in kilns for heat treatment of glass sheets where the sheets are directly rested on the roller device. It comprises at least a cleaning element 2, predisposed to enter into contact with the surface of at least a roller 100 and perform cleaning thereof. Motor means 30, 31, 32 are predisposed to activate the cleaning element 2 and slide at least along a longitudinal direction x of a roller 100.

In a preferred embodiment of the device, the motor means 30, 31, 32 are predisposed such as to activate the cleaning element 2 to move also along a first transversal direction y, perpendicular to the longitudinal direction x, between an active position, in which the cleaning element 2 is in contact with the surface of the roller 100, and an inactive position, in which the cleaning element 2 is distanced from the roller surface 100. The motor means 30, 31, 32 are further preferably predisposed to activate the cleaning element 2 to move along a second transversal direction z, perpendicular to the longitudinal direction x and to the first transversal direction y.

The motor means 30, 31, 32 enable the cleaning element to be moved above the roller 100 such that cleaning the surface of the roller is possible along the whole extension thereof. In particular, the cleaning of the surface of a roller 100 comprises that the cleaning element, initially located above an end portion of the roller, is made to descend from the inactive position into the active position. In the active position, the cleaning element 2 is made to slide along the longitudinal direction x on the surface of the roller 100 which is activated in rotation. The sliding velocity of the cleaning element 2 is such that each section of the roller 100 passes into contact with the cleaning element 2. After having reached the other end portion of the roller 100, the cleaning element is raised towards the inactive position and translates towards another roller 100, placing itself above an end portion thereof. From this position the cleaning element 2 descends towards the active position in which it enters into contact with the surface of the new roller 100 and begins to slide in a way that is similar to what has already been described.

In the preferred embodiment of the device, the said motor means 30, 31, 32 comprise a straight guide 30, arranged parallel to the longitudinal direction x, along which a carriage 31 is slidable, to which carriage 30 the cleaning element 2 is associated. The straight guide is preferably provided, at end zones thereof, with rest wheels 32 destined to be arranged in contact with the surface of the roller 100 such as to enable a predetermined positioning of the straight guide 30 with respect to the roller 100. The motor means 30, 31, 32 further comprise a device for translating the straight guide 30 along the second transversal direction z, such as to enable the cleaning element 2 to displace from a roller to the other rollers which make up the roller plane. A further device can be provided to translate the straight guide 30 along the first transversal direction y, such as to displace the cleaning element between the active position and the inactive position.

According to a first embodiment, the device comprises at least two cleaning elements 2, 2a distanced from one another in a parallel direction to the longitudinal direction x and predisposed to be positioned in contact with two distinct zones of the roller 100. According to a second embodiment, the device comprises two further cleaning elements 2b, 2c, distanced from one another in a parallel direction to the longitudinal direction x and predisposed to be positioned in contact with two distinct zones of a second roller 100a. All the cleaning elements, whether two or four in number, can be associated to a same carriage 31, such as to displace between the rollers 100 in synchrony. In the active position, the cleaning elements are arranged contemporaneously in contact with two rollers 100, 100a, which are therefore contemporaneously cleaned. A first pair of cleaning elements 2, 2a can advantageously be provided with characteristics of a certain type, for example the first couple can be suitable for performing a first general cleaning of the roller surfaces. The second pair of cleaning elements 2b, 2c can be more suitable for a more complete cleaning of the roller surface.

Preferably, the cleaning element 2, like the other cleaning elements 2a, 2b, 2c if present, comprises a support plate 3, predisposed to accommodate and retain an insert 4 destined to enter into contact with the surface of the roller 100 in order to clean it. The insert 4 can be made for example of an abrasive material. Presser means 5, preferably a helix spring, are predisposed to exert a thrusting action on the support plate 3, which presses the insert 4 into contact with the roller 100 surface. Thanks to the presence of the presser means 5, which are preferably elastic, the insert 4 is pressed elastically into contact with the surface of the roller 100. In this way the cleaning element 2 is able to remain in contact with the roller surface 100, even where there are surface irregularities which might be present on the surface of the insert 4 as well as on that of the roller 100.

As an alternative solution to the translation of the straight guide 30 along the first transversal direction y, at least a linear actuator can be predisposed (not illustrated) on board the carriage 31. The linear actuator can be associated to the cleaning element 2, and to the other cleaning elements 2a, 2b, 2c if present, such as to translate the cleaning element 2 with respect to the carriage 31 along the first transversal direction y.

The device according to the present invention can be provided with an aspirating device 7, 8 predisposed to remove the residues of the cleaning operation of the contact zone between the cleaning element 2 and the other cleaning elements 2a, 2b, 2c if present, and the rollers 100. The aspirating device comprises at least a conduit 7 which sets in communication an aspirating machine with a body 8 provided with as many aspirating mouths 81, 82, 83, 84 as there are cleaning elements.

The device according to the present invention provides important advantages. First and foremost it guarantees careful and efficient cleaning of the rollers. The device is further able to function completely autonomously, without any need for an operative to participate in the cleaning operations apart from checking the device from a remote location. The use of several cleaning elements enables the cleaning of the rollers to be made more rapid, and, if there are inserts of different materials, enables the rollers to be cleaned particularly carefully.

The invention further exhibits the characteristic, of crucial significance, of not requiring the removal of the rollers from the kiln. It is used with rollers in their seatings internally of the kiln.

The invention claimed is:

1. A roller cleaning device, in particular for roller kilns, comprising a cleaning element (2), predisposed to enter into contact with a surface of at least a roller (100) and to clean the said surface; motor means, predisposed to activate the cleaning element (2) to slide at least along a longitudinal direction (x) of the roller (100), characterized in that the motor means are predisposed to activate the cleaning element (2) to move along a first transversal direction (y), perpendicular to the longitudinal direction (x), between an active position, in which the cleaning element (2) is in contact with the surface of the roller (100), and an inactive position, in which the cleaning element (2) is removed from the surface of the roller (100),the motor means being predisposed to activate the cleaning element (2) in movement along a second transversal direction (z), perpendicular to the longitudinal direction (x) and to the first transversal direction (y).

2. The device of claim 1, wherein the motor means comprise a straight guide (30) arranged parallel to the longitudinal direction (x), along which a carriage (31) slides, to which carriage (31) the cleaning element (2) is associated.

3. The device of claim 2, wherein the straight guide (30) is provided at end zones thereof with rest wheels (32) destined to come into contact with the surface of the roller (100) in order to enable a predetermined positioning of the straight guide (30) with respect to the roller (100).

4. The device of claim 2, wherein the motor means comprise a device for translating the straight guide (30) along the second transversal direction (z).

5. The device of claim 2, wherein the motor means comprise a device for translating the straight guide (30) along the first transversal direction (y).

6. The device of claim 2, wherein the motor means comprise at least a linear actuator associated to the carriage (31) and predisposed to translate the cleaning element (2) along the first transversal direction (y).

7. The device of claim 1, wherein the cleaning element (2) comprises: a support plate (3), predisposed to receive and retain an insert (4) destined to enter into contact with the surface of the roller (100) in order to clean the roller (100); presser means (5), predisposed to exert a thrust action on the support plate (3) which presses the insert (4) into contact with the surface of the roller (100).

8. The device of claim 7, comprising two further rollers (2b, 2c) which are reciprocally distanced in a parallel direction to the longitudinal direction (x) and predisposed to be positioned in contact with two distinct zones of a second roller (100a).

9. The device of claim 1, comprising at least two cleaning elements (2, 2a) which are reciprocally distanced in a parallel direction to the longitudinal direction (x) and predisposed to be positioned in contact with two distinct zones of the roller (100).

10. The device of claim 1, comprising an aspirating device (7, 8) predisposed to remove residues of cleaning from the contact zone between the cleaning element (2) and other cleaning elements (2a, 2b, 2c) if present, and the rollers (100).

\* \* \* \* \*